United States Patent [19]
Schmidt et al.

[11] 3,950,452
[45] Apr. 13, 1976

[54] POLYURETHANE HIGH-VOLTAGE INSULATOR APPLIANCE

[75] Inventors: Karl Schmidt, Wiesbaden; Gerhard Boockmann, Steinheim, both of Germany

[73] Assignee: Dr. Beck & Co. AG, Hamburg, Germany

[22] Filed: Jan. 21, 1972

[21] Appl. No.: 219,824

Related U.S. Application Data

[63] Continuation of Ser. No. 33,176, May 8, 1970, abandoned, which is a continuation of Ser. No. 719,224, April 5, 1968.

[30] Foreign Application Priority Data

Apr. 24, 1967  Austria .............................. 3873/67

[52] U.S. Cl.... 260/859 R; 174/110 SR; 174/137 A; 174/137 B; 174/DIG. 1; 260/75 NK; 260/77.5 AT

[51] Int. Cl.² C08G 18/42; C08L 75/06; H01B 3/30

[58] Field of Search............. 174/137.1, 137.2, 209, 174/110.8; 260/75 TN, 75 NA, 75 NT, 75 NH, 77.5 R, 77.5 AT, 77.5 ZH, 77.5 AM, 77.5 AP

[56] References Cited
UNITED STATES PATENTS

| | | | |
|---|---|---|---|
| 2,333,922 | 11/1943 | Foster................................ | 174/125 |
| 3,211,585 | 10/1965 | Meyer et al......................... | 117/232 |
| 3,291,859 | 12/1966 | Tobolsky............................. | 260/859 |

*Primary Examiner*—H. S. Cockeram
*Attorney, Agent, or Firm*—Michael J. Striker

[57] ABSTRACT

A weather-resistant high-voltage electrical insulator appliance, or at least a portion thereof which is exposed to the atmosphere, is formed of a solvent-free aliphatic polyurethane which is at least substantially free of aromatic groups.

5 Claims, No Drawings

POLYURETHANE HIGH-VOLTAGE INSULATOR APPLIANCE

This application is a continuation of application Ser. No. 33,176 filed May 8, 1970 now abandoned, which in turn is a streamlined continuation application of Ser. No. 719,224, filed by us on Apr. 5, 1968.

BACKGROUND OF THE INVENTION

The present invention relates to voltage insulator appliances and particularly to high-voltage insulator appliances which are exposed to the outer atmosphere.

The terms "insulator", "insulator appliance", "electrical insulator" and "electrical insulator appliance" as used herein designate an appliance used to insulate a conductor from earth, or from another conductor and frequently also serving to support the conductor (*Chambers Technical Dictionary*, MacMillan Co., N.Y. 3rd Edition 1959, page 451 and *Van Nostrands Scientific Encyclopedia*, D. Van Nostrand Co., N.Y., 3rd Edition, 1958 pages 569–570).

It has been proposed to make such insulators, which should be weather-resistant even when exposed to high-voltage currents, of synthetic resins. Particularly, cycloaliphatic epoxy resins were proposed for this purpose which resins, preferably, were to be hardened with cycloaliphatic reactants. Unfortunately, however, such cycloaliphatic epoxy resins are only difficultly obtainable and thus relatively expensive, and thus, for economic and technical reasons, these cycloaliphatic epoxy resins do not fulfill the growing requirements for weather-resistant high-voltage insulators.

It has been proposed therefore to produce such insulators of two layers, namely so that the core portion was to be produced of relatively inexpensive synthetic resins which need not be as weather-resistant as the portion of the insulator appliance which actually is exposed to the outer atmosphere, and of an outer layer formed of a weather resistant, possibly fiber-reinforced, synthetic resin. Again, cycloaliphatic epoxy resins were proposed for forming the outer, exposed portion of such insulators.

However, it has since been found that the weather resistance of the conventional cycloaliphatic epoxy resins, when exposed to high voltage, does not meet the requirements in such cases. As is known under the influence of a creep current or an electric arc, conductive residues may be formed. An electric arc may be generated due to the deposition of a conductive dust layer formed at the surface of the insulator on exposure to industrial gases or ocean climate. This process may be simulated in a standard test procedure in the laboratory by repeatedly applying a thin graphite layer with a pencil to the surface of the insulator appliance and then burning off the graphite layer by applying a voltage thereto. The test is considered successful if the electric arc which is formed is extinguished in spite of even repeated exposure to the current and the voltage differential applied is maintained.

This property which indicates the weather resistance of the insulator appliance may be termed "creep current resistance regarding an extraneously formed layer".

It is therefore an object of the present invention to provide a weather-resistant high-voltage insulator appliance which will possess a high degree of creep current resistance.

SUMMARY OF THE INVENTION

According to the present invention, at least the outer face portion of the high-voltage insulator appliance which is in contact with the outer atmosphere, or the entire insulating body of the high-voltage insulator is formed of a solvent-free aliphatic polyurethane which is at least substantially free of aromatic groups.

DESCRIPTION OF THE PREFERRED EMBODIMENTS

Surprisingly, it has been found that synthetic resin insulator appliances which are highly weather-resistant even when exposed to high voltages and which possess a high creep current resistance and thus are excellently suitable for use in contact with the outer atmosphere, or entirely in the open, may be formed of solvent-free straight-chain or branched aliphatic polyurethanes, for instance polyesterurethanes, which also may contain urea groups. These types of polyurethane have an excellent creep current resistance. It is within the scope of the present invention either to form the entire insulating body of the insulator appliance of such polyurethanes, or to form on a core of different material an insulating outer layer consisting thereof.

The hydroxyl groups-containing compounds which are used in producing the aliphatic polyurethanes may also be, for instance, OH-groups-containing polyethers, in which case branched polyethers are preferred, such as the polyethers which may be produced of trimethylolpropane and propylene oxide and which have OH-equivalents of between 100 and 2000.

It is also advantageous to utilize polyesters in producing the polyurethanes, whereby preferably such polyesters will be used which have OH-equivalents of between 100 and 2000. To produce such polyesters, preferably such alcohols or carboxylic acids are used which form particularly weather-resistant or hydrolysis-resistant esters.

Those skilled in the art will understand that these particularly suitable compounds include the carboxylic acids in which the carboxyl group is located at a tertiary carbon atom, and alcohols with secondary OH groups or alcohols in which the OH groups are subjected to steric hindrance due to side groups at the alpha carbon atom, as is the case for instance with 2,2-dimethylpropandiol.

Polyurethane lacquers which are produced under utilization of aromatic reactants are not suitable for the present purpose due to their poor resistance against formation of electric arc discharges. Furthermore, only thin layers of such lacquers can be formed which are burned off quickly if exposed to electric arcs so that the underlying material would be exposed to atmospheric influences and the applied voltage.

In contrast thereto, the materials of which at least the exposed portions of the high-voltage insulator appliance of the present invention are formed are free of solvents, i.e., these materials harden even in layers of great thickness without giving off volatile, non-reactive substances.

Thus, it is also within the scope of the present invention to produce cast resin insulators which are formed only of a single synthetic resin, namely of a solvent-free aliphatic polyurethane which is at least substantially free of aromatic groups.

It was rather surprising to find that the aromatic or cycloaliphatic polyurethanes are not suitable for producing weather-exposed high-voltlage insulators, whereas the aliphatic polyurethanes are excellent suitable for this purpose, inasmuch as the aliphatic polyurethanes, with respect to their mechanical and thermal properties, are generally considered inferior to aromatic or cycloaliphatic polyurethanes.

The polyurethane body which is utilized according to the present invention must be free of solvent and the polyurethane should have a purely aliphatic structure. The polyurethane may include ester, ether or urea groups and the polyurethane molecule may be built of straight-chain or of aliphatically branched groupings or reactants. However, it is essential that the polyurethane is substantially, and preferably completely, free of aromatic or other cyclic groups. In certain cases, the polyurethanes may include olefinic double bonds.

Thus, suitable polyurethanes which may be utilized for forming the weather-resistant high-voltage insulator appliance body or the exposed portion thereof include polyurethanes derived from hydroxyl groups-containing polyesters, polyurethanes derived from hydroxyl groups-containing polyethers, and polyurethanes derived from polyesters or polyethers or both which, in addition, contain amino groups, i.e., compounds with hydroxyl and amino groups (or urea groups).

It is also possible that the ether, ester or urea groups are introduced into the polyurethane by being originally incorporated in the polyisocyanate compound.

Additionally, suitable polyurethanes may be obtained from straight-chain aliphatic hydroxyl groups-containing compounds and straight-chain aliphatic isocyanate groups-containing compounds or from branched, aliphatic hydroxyl groups-containing compounds, and/or branched aliphatic isocyanate groups-containing compounds.

Those skilled in the art are well aware of the aliphatic carboxylic acids and alcohols of which suitable polyesters and polyethers can be formed, and the aliphatic isocyanates are also well known to those skilled in the art.

Suitable hydroxyl groups-containing compounds include the diols $(CH_2)n(OH)_2$, the dicarboxylic acids $(CH_2)n(COOH)_2$ and suitable isocyanates include diisocyanates $(CH_2)n(NCO)_2$ whereby hexamethylenediisocyanate represents a particularly suitable reactant.

Branched aliphatic compounds which may be used for producing the aliphatic polyurethanes utilized according to the present invention include diols such as neopentylglycol, 2,2,4-trimethylpentandiol-1,3; 2,2,4-trimethylhexandiol-1,6 or triols such as trimethylolpropane, dicarboxylic acids such as dimethylsuccinic acid or trimethyladipic acid, and suitable branched diisocyanates include trimethylhexanediisocyanate.

The polyurethanes are formed by reaction between the hydroxyl group and isocyanate group-containing compounds in per se conventional manner. It is possible to have the conventional excess of either hydroxyl or isocyanate groups, depending on the desired degree of cross-linking and also depending on the specific reactants, for instance the number of hydroxyl groups in the hydroxyl polyester.

It is also within the scope of the present invention to utilize aliphatic branched or straight-chain polyurethanes, for instance polyester urethanes which include vinylesters, methacrylic esters and/or acrylic esters either as monomeric compounds or bound to the polyhydroxyl or polyisocyanate compound, and which additionally include radicals forming and/or the formation of radicals accelerating or retarding materials, whereby further cross-linking will be accomplished and shaped bodies with better mechanical properties may be obtained and the desired viscosity for working up or casting of the high-voltage insulator bodies can be easily adjusted.

Thus, olefinic unsaturated groups may be incorporated in the polyurethane, for instance as an addition of unsaturated monomeric compounds (reactive thinning agents) of acrylic or methacrylic esters of straight-chain or branched alkanols, or di-acrylic or di-methacrylic esters of straight chain or branched alkanediols, vinyl or divinyl esters of straight-chain or branched aliphatic mono- or dicarboxylic acids.

The polymerizable component may also be incorporated into the OH group-containing component by means of ester-bridges in the form of acrylic, methacrylic or vinyl esters, or it may be incorporated into the isocyanate component by a preliminary reaction of the isocyanate compound with hydroxyalkyl acrylate or methacrylate.

However, unsaturated compounds with non-polymerizable or only difficultly polymerizable double bonds, such as are present in cyclohexene or vinyl ethers or crotyl esters, cannot be used, and furthermore, no cyclic or aromatic compounds such as styrene may be incorporated.

Radical-forming materials which may be incorporated are peroxides or azo compounds and they are preferably incorporated in an amount equal to between 0.1 and 5.0% by weight of the total reaction mixture.

Accelerators may be tertiary amines, heavy metal salts (preferably cobalt or vanadium salts) in a proportion equal to between 0.01 and 1% by weight of the total reaction mixture.

Suitable inhibitors inclulde oximes, phenols and quinones in proportions of between about 0.001 and 0.1% by weight of the entire reaction mixture.

The desirability of these additions depends on the required storability of the mixture and the hardening conditions. Thus, for instance, hardening at ambient temperature requires the incorporation of an accelerator, whereas—if hardening is to be carried out at substantially elevated temperatures—such accelerator will not be required.

Preferably these additives will be aliphatic compounds, although, in view of the small proportions thereof, it is also possible to use aromatic additives since the harmful effect of such small proportions will be relatively insignificant.

The creep current resistance of the weather-resistant high-voltage insulating appliance of the present invention may be tested in the following manner:

A standard rod of 10 × 15 × 100 mm is provided at its end portions at a distance of 40 mm with a conductive graphite layer. Between these two electrodes, the test material is superficially scratched with a sharp tool. By making lines with a lead pencil, the graphite electrodes are conductively connected so that a resistance of about 50 k Ω will be formed. Thereafter, the following testing cycle is carried out whereby after each individual testing the lead pencil mark is renewed. Testing is carried out with alternating current of 50 Hz.

1a. Increase in voltage from 0 to 8 kV at a rate of 0.5 kV per second.

1b. Applying the full voltage of 8 kV and at least 2–5 full repetitions of the testing cycle 1a–1b.

The bodies formed of the reaction mixture as described in the following Examples were all found to have the desired creep current resistance throughout the five testing cycles and generally beyond.

The following Examples are given as illustrative only without, however, limiting the invention to the specific details of the Examples.

EXAMPLE I

134 G 1,2,5-hexanetriol are reacted at 80° C with 90 g hexamethylene-diisocyanate. After subsiding of the exothermic reaction, the reaction product is mixed at 60° C with 162 g hexamethylene-diisocyanate, degasified under stirring for about 1 minute, and the thus-obtained reaction mass poured into molds. The thus-produced molded bodies are subjected to further hardening for 4 hours at 120° C and tested after cooling. Testing was discontinued after ten successive test cycles were successfully completed.

EXAMPLE II 34.5 G 1,2,5-hexanetriol, 63.0 g hexamethylenediisocyanate, 20.0 g methacrylic acid isobutylester, 1.0 g tertiary butylperisooctoate, 0.5 g of the accelerator commercially available under the tradename "M-2" and consisting of a solution of vanadyl-p-toluenesulfonate in isopropyl alcohol xylene having a 1% metal content, and 1.0 g dimethylcyclohexylamine are stirred at a sub-atmospheric pressure of 50 mm Hg until a clear solution is formed, and the thus obtained solution is poured into molds. The molded body is hardened for 24 hours at room temperature and thereafter for 2 hours at 120° C. Testing through five cycles as described above showed the desired creep current resistance.

EXAMPLE III

The process of Example II was followed; however, the methyacrylic acid isobutylester was replaced by an equal amount of vinyl ester of the product commercially available under the tradename "Versatic Acid 9" and consisting of a mixture of highly branched saturated aliphatic acids containing 9 carbon atoms. In this manner, a milk-white body was formed which also had the desired creep current resistance for more than five testing cycles.

EXAMPLE IV

An ester having an acid number of 5.5 and an OH-equivalent weight of 255 was produced from 1 mol adipic acid, 1 mol trimethylopropane and 0.2 mol hexanol.

80 G of the thus-formed polyester, 30 g methylmethacrylate, 20 g hexamethylenediisocyanate, 0.5 g dimethylcyclohexylamine, 0.5 g accelerator M-2,and 1 g tertiary butylperisooctoate were mixed and then poured into molds. After hardening for 24 hours at room temperature and 2 hours at 120° C, the above-described test was carried out and the desired creep current resistance was found still to exist after more than 5 testing cycles.

EXAMPLE V

The process of Example IV was carried out, but with the difference that the methylmethacrylate was replaced by 2-ethylhexylacrylate. Upon testing, results comparable to these obtained with the insulator appliance of Example IV were obtained.

EXAMPLE VI 25.5 G of the polyester obtained according to Example IV and 14.9 g of a triisocyanate formed on the basis of hexamethylenediisocyanate available under the tradename "Desmodur N" and which previously had been freed from volatile constituents by evaporation under vacuum at 80° C, were mixed and poured into molds. After hardening for 24 hours at room temperature, the thus-obtained insulator appliances were subjected to five testing cycles after which they still possessed the desired creep current resistance.

EXAMPLE VII 25.5 G of the polyester obtained according to Example IV were mixed with 10.5 g of an isomeric mixture of 2,4,4' and 2,2,4-trimethylhexamethylenediisocyanate, degasified under vacuum, cast and hardened for 24 hours at room temperature and then for 2 hours at 120° C. After five testing cycles, the thus-formed insulator appliances still maintained the desired creep current resistance.

For purposes of comparison, polyurethanes outside the scope of the present invention were tested with the following results:

TEST I

134 G 1,2,5-hexanetriol and 250 g diphenylmethanediisocyanate were separately heated to 100° C, stirred under vacuum for five minutes, quickly mixed and then cast into molds wherein the mixture hardened within a few minutes. After further hardening for 4 hours at 120° C, the thus-formed insulator appliance was tested as described above and was found to fail at 2 kV.

TEST II 44.7 G 1,2,5-hexanetriol and 111 G trimethylisocyanate-methylcyclohexylisocyanate were heated under stirring to 60° C, degased until a clear mixture had formed and then cast. Hardening of the thus-obtained insulator appliance was carried out for 4 hours at 180° C followed by 4 hours at 120° C.

Upon testing, the insulator appliance failed in the test 1a upon reaching a voltage of 8 kV.

TEST III

Test II was repeated; however, cyclohexylacrylate was used as the monomeric polymerizable compound and it was found that the insulator appliance failed after three test cycles.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a weather-resistant electrical high voltage insulator appliance used to support or separate a conductor from the earth or from another conductor to prevent a flow of current between them or to another object at least the parts of the high voltage insulator exposed to the atmosphere consist of a solvent free aliphatic polyurethane substantially free of aromatic and cycloaliphatic groups obtained by reacting a diisocyanate with a hydroxy group containing aliphatic compound.

2. A weather resistant electrical high voltage insulator appliance according to claim 1 wherein said aliphatic polyurethane is formed by reaction of hexamethylene-diisocyanate or trimethyl hexamethylenediisocyanate with said hydroxy group containing aliphatic compound.

3. A weather resistant electrical high voltage insulator appliance according to claim 2 wherein said hydroxy group containing aliphatic compound is hexane triol.

4. A weather resistant electrical high voltage insulator appliance according to claim 1 wherein said hydroxy group containing aliphatic compound is an aliphatic polyester formed by reaction of adipic acid and a straight chain polyhydroxy aliphatic compound.

5. A weather resistant electrical high voltage insulator appliance according to claim 1 wherein said polyurethane has incorporated therein at least one member selected from the group consisting of straight chain and branched aliphatic acrylic esters, methyl acrylic esters and vinyl esters.

* * * * *